Sept. 22, 1936.  J. W. TAYLOR  2,054,916
AUTOMATIC CONTROL VALVE
Filed Dec. 11, 1933  2 Sheets-Sheet 1
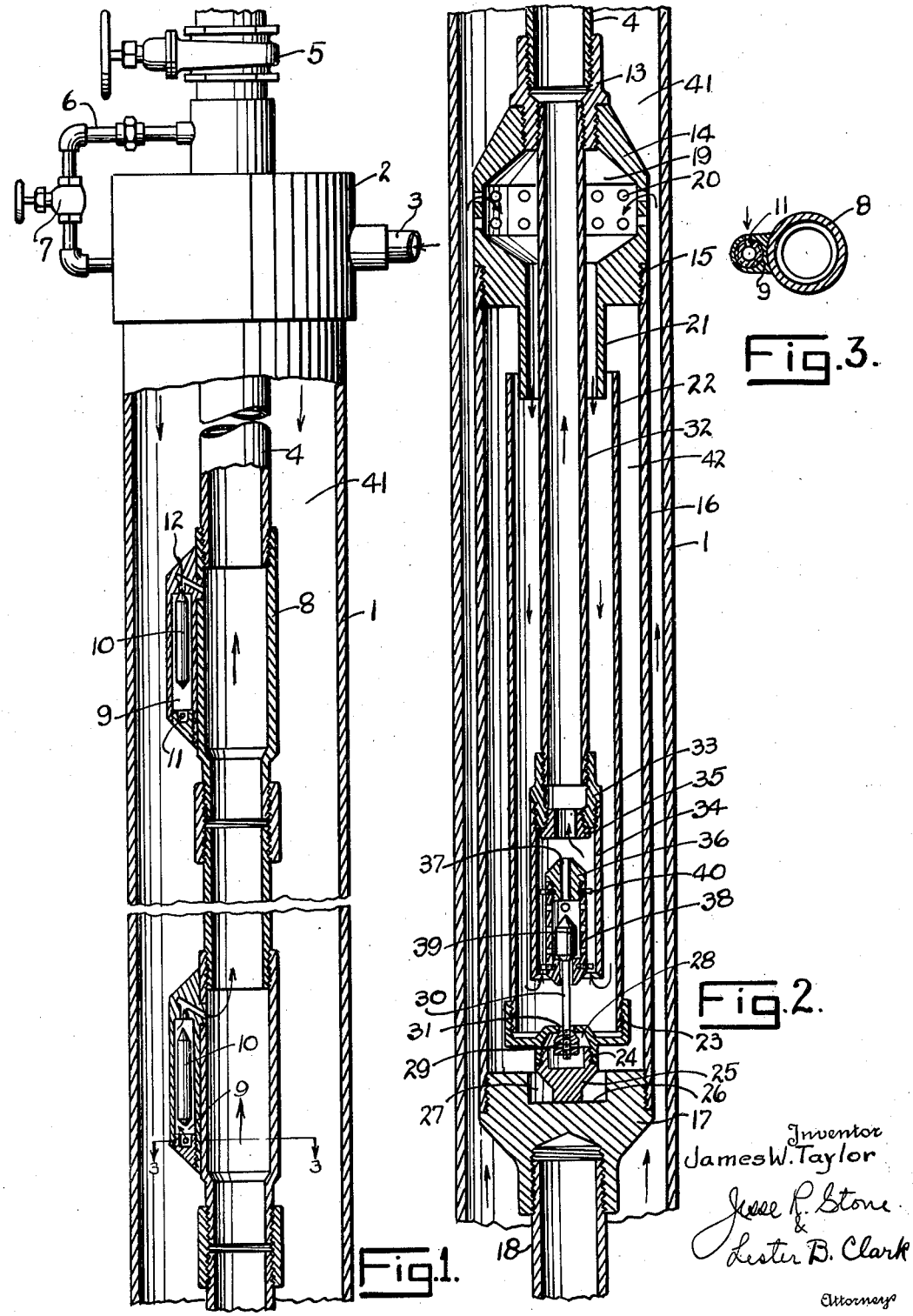
Inventor
James W. Taylor
Jesse R. Stone
& Lester B. Clark
Attorneys Sept. 22, 1936.  J. W. TAYLOR  2,054,916
AUTOMATIC CONTROL VALVE
Filed Dec. 11, 1933  2 Sheets-Sheet 2
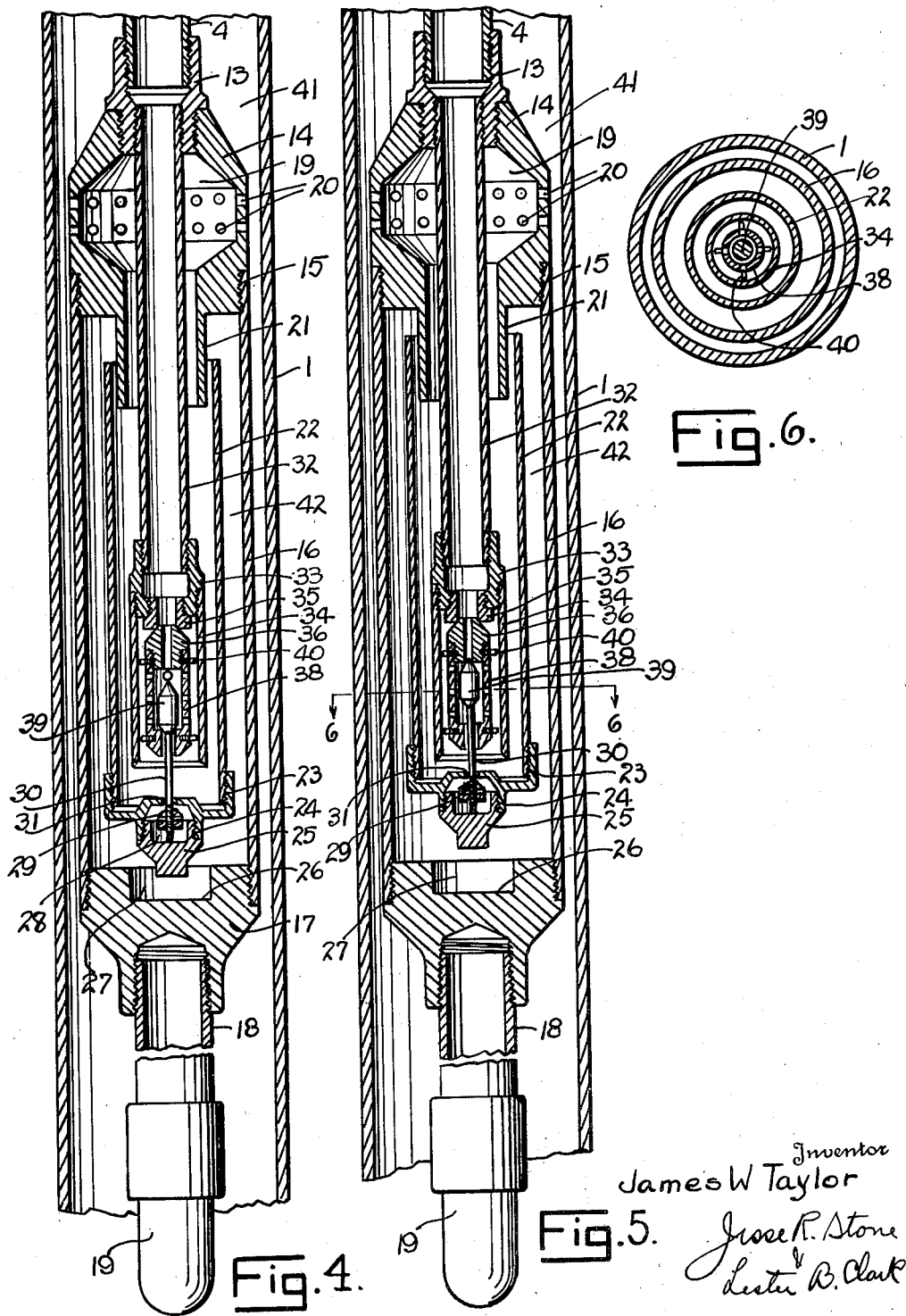
Inventor
James W Taylor
Jesse R. Stone
Lester B. Clark
Attorneys Patented Sept. 22, 1936

2,054,916

UNITED STATES PATENT OFFICE 2,054,916

AUTOMATIC CONTROL VALVE

James W. Taylor, San Antonio, Tex.

Application December 11, 1933, Serial No. 701,794

13 Claims. (Cl. 103—234)

My invention relates to control valves for use in connection with air lift devices by means of which fluid is raised in a well tube and discharged at the surface.

The invention pertains particularly to the construction of the control valve to be employed at the lower end of the eduction tube and in combination with a series of kick-off valves in the tubing above to prevent the waste of air or gas through the lower end of the tubing when the liquid level in the well has reached the lower limit of the tubing.

Heretofore devices of this character have not been successful, for, due to the necessity of economizing in lateral space, it has not been possible to design a valve that would not become fouled from sand and other sediment carried by the oil and water in the average well. The unsuccessful attempts that have been made to use float valves have been due to the fact that they have carried what was intended to be a "balanced" valve, i. e., a valve that will operate against high pressure differentials on its opposed sides without the higher pressure offering resistance to movement. But it is well known in mechanics that the "slide" valve is the only valve capable of being "balanced" to a point where its operation is not influenced by unequal pressures on the inlet and outlet sides. When it is remembered that the force that operates the float valve cannot be greater than the weight of the liquid displaced by the float, it at once becomes apparent that the slide valve cannot be successfully used where sediment of any kind may find its way into the mechanism, for just a few grains of sand will create friction to a point where a much greater force is necessary to move it than the float is capable of exerting.

But even though there were present sufficient force to operate the slide valve, it would soon become worn to a degree where it would no longer perform its function. Furthermore, where used in wells, the float actuated valve will seek a position where its open area is adapted to the volume of liquid entering the well. In other words, where the balanced valve is used the float will hold the liquid in the well at a fixed level by "pinching down" the valve; and this has the result that sand carried by the liquid soon destroys the valve by cutting away its seats and adjacent parts.

The present invention eliminates the difficulties above pointed out by avoiding any attempt to "balance" the valve mechanism, and its construction is such as to secure a positive opening and closing of the fluid entry in the bottom of the tubing in such a manner as to avoid any "pinching" that would result in cutting away the parts.

I desire to provide a valve of this character which opens and closes in a positive manner so that the valve will completely open or close without remaining in an intermediate position.

I also desire to provide a plurality of connected valve members whereby the size of the opening into the eduction tube may be changed if desired.

In the drawings herewith I have illustrated a preferred embodiment of the invention, and in Fig. 1 is shown a view mostly in central vertical section showing the upper end of the well equipment wherein my invention is employed.

Fig. 2 is a similar longitudinal section showing the apparatus at the lower end of the well and more particularly illustrating the present invention.

Fig. 3 is a transverse section taken on the line 3—3 of Fig. 1.

Figs. 4 and 5 are longitudinal sections similar to that disclosed in Fig. 2 but illustrating different positions of the control valve.

Fig. 6 is a transverse section on the plane 6—6 of Fig. 5.

In the drawings I have disclosed a well casing 1 of ordinary construction, which serves to hold up the wall of the well. The upper end of the casing has a casing head 2 thereon, said casing head having a lateral connection 3 with a pipe through which gas or air may be introduced into the well or which may serve also as a vent for excess pressure in the well.

The tubing or eduction pipe 4 is extended from the surface through a fluid tight connection with the casing head 2 downwardly to the desired level in the well. The upper end of the tube projecting above the casing head may be provided with a gate valve 5 controlling the discharge of fluid into the flow line. I have also shown a connection between the eduction tube and the casing head. This is accomplished by means of a pipe 6 connected into the eduction tube above the casing head and connected at its lower end with the casing head 2.

A manually controlled valve 7 in this line will be normally closed but, when connection is desired between the eduction tube and the interior of the casing at the upper end, this valve may be opened, as will be later described.

The eduction tube is provided at different levels in the well with a series of coupling members 8, each of which is provided with a lateral valve chamber 9, in which is housed an elongated valve member 10. There is an inlet for pressure fluid at the lower end of the valve housing 9, as is indicated at 11. The upper end of the valve chamber has connection, by means of the downwardly inclined passage 12, with the interior of the coupling and the eduction tube. The form of kick-off valve herein disclosed may be varied, the exact construction of the valve forming no part of the present invention.

At the lower end of the eduction tube, I provide an automatic control valve. The construction of this valve involves the use of several concentric pipes. The eduction tube 4 is connected by means of a coupling 13 with a nipple 14. This nipple is swaged outwardly and has a threaded connection at 15 with an outer tubular housing 16, said housing being connected at its lower end to a plug 17, which serves to close the lower end of the housing. Said plug has a connection at its lower end with a downward extension 18, which acts simply to space the lower end of the eduction tube the proper distance from the lower end of the well.

As will be seen in Fig. 4 and Fig. 5, I contemplate closing the lower end of the extension 18 with a bull plug 19. This tube, as will be obvious, carries no flow of fluid.

The nipple 14 has an interior chamber 19, formed with lateral openings 20 leading to the interior of the casing outside of the nipple. The lower end of the nipple within the housing 16 has a downwardly extending skirt 21, which projects a suitable distance into an upwardly extending float member or receptacle 22 and forms a fluid inlet.

Said float member 22 is of the bucket type, the upper end being open and the lower end being closed by a special cap 23, which has a short annular flange 24 at its lower end, threaded to receive a plug 25, the lower end of which forms a stop member adapted to contact with a shoulder 26 in a shallow recess 27 at the upper end of the plug 17. The cap, together with the plug 25, is formed with a small chamber 28 to receive a stop member 29 upon the lower end of the valve stem 30. There is an opening 31 in the upper end of the chamber 28, which allows free sliding movement of the valve stem therein. The stop member 29 on the lower end of the stem may have a limited movement in the chamber between the upper and lower walls thereof.

The eduction tube 4 is continued downwardly through the nipple 14 and into the open upper end of the float 22. This extension 32 of the tubing is connected at its lower end, by means of a special coupling 33, with the valve chamber 34. The lower end of the coupling 33 is threaded interiorly to receive a valve seat 35.

Within the housing 34 is a valve 36 which has an upwardly tapered end to fit within the seat 35. It has a constricted passage 37 therethrough to control the flow of fluid into the eduction tube and acting, when desired, as a choke member. The lower end of this valve head is connected with a perforated tube 38 extending downwardly therefrom and having a closure member at its lower end, said closure member being provided with a central opening through which the valve stem 30 may project. Said valve stem has a head 39 within the member 38, the upper end of which is adapted to engage within the lower end of the passage 37 and close the same during the normal operation of the device. It will be noted that the valve member 36 has a floating position within the valve chamber 35 and is limited as to its downward movement by contact with the valve head 39 and is limited in its upward movement by the valve seat 35. I provide laterally projecting pins 40 on the tubular member 38 to space the valve from the housing and to center the same so that it will move accurately to and from the seat. The walls of the tubular member 38 are perforated to allow the free passage of fluid through the walls thereof.

In the operation of my device with the usual type of kick-off valve, it is to be understood that there will be a pressure of air or gas within the chamber 41 between the casing and the eduction tube. Where the pressure of the air or gas outside the tubing is greater than the pressure within the tube at that level by a predetermined amount, the valve 10, will be forced upwardly to close the passages 12 to the interior of the tube and will be held in that position so long as the pressure differential is maintained above the minimum which causes the valve to close.

It is to be understood that the kick-off valves will thus allow the head of liquid above the valve to be raised by means of the fluid pressure to the surface where it will be discharged into the flow line. As the level of liquid is gradually reduced through means of the pressure fluid entering past the kick-off valves, it will gradually approach the lower end of the eduction tube unless the flow of liquid into the well is great enough to maintain the level at a point above the nipple 14. The flow of liquid from the well will be through the openings 20 in the nipple 14 and into the interior thereof and downwardly through the skirt 21 and the interior of the float and thus, following the direction of the arrows in Fig. 3, will flow upwardly through the eduction tube to the surface.

In case the supply of liquid from the well is not sufficient to maintain the level above the openings 20, it will be seen that the air or gas would begin to flow through these openings and downwardly to the lower end of the tubing. In doing so the liquid within the float member 22 will be forced out of the same while the chamber 42 will remain filled with liquid. As the level of liquid is depressed within the float member a point will be reached where the buoyancy of the float will cause it to move upwardly within the housing. This upward movement will cause the plug 25 at the lower end of the float member to be raised upwardly away from its support on the shoulder 26 and to engage the lower end of the valve stem 30, and thus move said valve member upwardly to close the passage 37.

The continued movement of the float will move the valve 36 into the seat 35 and thus close entirely the passage of fluid into the eduction tube. This movement will be fairly abrupt so that in the closing action of the valves there will be no period when the valve will "pinch", that is, where the fluid will be blown through a narrow passage between the valve and its seat. Thus the difficulty of cutting away the valve and its seat during the opening and closing action thereof will be largely eliminated. When the valves are closed they will be in the position disclosed in Fig. 5.

When the valve has closed, the flow of liquid into the well will gradually raise the level in the casing above the opening 20 in the nipple and the oil or other liquid will flow downwardly in the route shown by the arrows in Fig. 2, and as the float is filled with liquid it will soon become heavier and will drop downwardly in the chamber 42 to open the valve. The air within the housing will bubble upwardly and out through the openings 20 in an obvious manner. When the float has become heavy through the flow of liquid to its interior it will move downwardly and will engage the stop member 29 at the lower end of the valve stem as seen in Fig. 4. This will pull the valve 39 from its seat at the lower end of the passage 37 and allow a limited flow of liquid into the tube. If the flow from the well is slow, the openings 37 through the valve may be sufficient to carry the entire flow from the well and in such case the float may assume an intermediate position, as shown in Fig. 4, with the valve 40 still seated, but in case there is a greater flow of fluid the float will continue to drop downwardly and the valve head 39 will be engaged against the lower end of the tubular member 38 and will pull the upper valve 40 from its seat also, thus allowing a full open flow into the eduction tube.

It is of importance that the construction of my control valve is such that trouble through sand in the oil or water is largely eliminated. When the device is first lowered into the well the float and housing immediately fill upon being submerged. This means that the first liquid that enters the annular space 42 within the housing, as well as that which enters the float, will be clean and free from any sediment, and since this liquid will be trapped between the float and the wall of the housing it will tend to prevent the entry of other liquid into the annular space 42. This will prevent sand and the like from finding its way under the float so as to interfere with its operation. The extension of the skirt 21 into the upper end of the float member is sufficient to allow the passage of either the fluid or the sediment contained therewith around into the chamber 42, which is already filled with liquid. When it is remembered that the tubing will be open to flow by the float in every instance before the latter fills completely, it will be seen that any sediment entering with the liquid is the first to be carried out when the valve opens. The skirt itself provides a shield to prevent sediment entering the annular space 42 and thus tending to impede the action of the float.

If for any reason either or both the valve members 36 or 39 at the lower end of the eduction tube should fail to move away from the passages which they control, then I may use the connections 5 and 6 at the upper end of the well to overbalance the pressure of the liquid in the well so as to cause the opening of these valves. This will be done by closing the valve 5 and opening the valve 7 and allow the flow of pressure fluid in the well around into the upper end of the eduction tube so that this equalizing of the pressure together with the head of liquid in the eduction tube will cause the flow of liquid downwardly in the tube and past the valves in such manner as to not only open the valves but to flush the lower end of the float. Thus it will be possible to free the valves and also to clear out any accumulations that may occur in the valve chamber and the lower end of the float. After reversing the pressures by manipulating the valves 5 and 6 as described, then the valve 7 is closed and the valve 5 opened to again permit flow of fluid from the well. From this it will be seen that the operator is assured of means to keep the equipment in operation while handling liquids that carry a large amount of sand and sediment and it is further to be noted that the construction of the float and its accessory parts is such as to reduce friction or resistance to movement to the minimum.

Referring to the valve 10, the function and operation of which has previously been pointed out, this will be located approximately ten feet above the float housing 16, and its operation is an important factor in the operation of the float valve. For, if the well be operating under high pressure, and valve 10 should at each "head" discharge all the liquid above it from the flow pipe 4, then a high pressure differential would be established between the float and flow pipe at the end of each flow. This would tend to hold the valves in the lower end of the float closed after each "head", where the well was flowing intermittently. Experience has shown that this difficulty can be obviated by controlling to a known quantity the volume of gas flowing through the valve 10 at the instant of its closing.

For example, if only twenty-five per cent of the liquid standing in the tubing is discharged when the well heads, then the tubing pressure, which will be pressing back against the valves 36 and 39 in the float, will always be within twenty-five per cent of the well pressure. Thus, it is seen that all danger of the float's failure to operate by reason of high differential pressures is eliminated by controlling the percentage of liquid discharged from the tubing at each flow period.

It will be understood that the primary purpose of the valve member 36 is to provide a large outlet from the float to the flow line, for there would be danger of clogging from sediment carried by the liquid if the passage be small and no provision be made to remove accumulations from the bottom of the float. As pointed out above, the larger passage may be opened at any time to flush the float by manipulating the valves 5 and 7 in such a manner as to cause a reversal of the pressure in the flow line. Reversing the pressure on the "balanced" valve does not have this effect, but, on the contrary, causes it to close.

From the foregoing it will be seen that the device can be used to flow wells producing but a few barrels per day, just as economically as wells of large capacity, for it is the volume of liquid entering the well that determines the volume of air or gas that flows into the tubing; and if the valve that admits the operating fluid to the liquid maintains the proper ratio between the two, maximum efficiency will be obtained.

But most important of all is the ability of the operator to hold the flow of liquid from the well to any desired amount below its capacity, by merely controlling the gas pressure in the casing, for it is well known that the flow of the liquid from the producing stratum is retarded as the gas pressure in the casing is raised, from which it is seen that it is easily practicable to increase the casing pressure of the average well to a point where any desired flow may be obtained. The value of this lies in the fact that where oil wells are prorated, the producer is enabled to maintain continuous operation of the well while producing the allowable output. Furthermore, due to the fact that the device in question is so constructed as to automatically maintain a predetermined gas-oil ratio, another troublesome feature, i. e. the escape of gas through the lower end of the tubing, is eliminated from flowing oil wells.

What is claimed as new is:

1. In a fluid lift device, an eduction tube, a housing at the lower end thereof, said housing being closed except for fluid openings at its upper end, a valve seat at the lower end of said tubing in said housing, a valve below said seat and float operated means to control the movement of said valve.

2. In a fluid lift device, an eduction tube, a housing at the lower end thereof, said housing being closed except for fluid openings at its upper end, a valve seat at the lower end of said tubing in said housing, a valve below said seat, a tubular float member closed at its lower end and spaced about said tube, a valve associated with said float and adapted to engage said seat, said float operating to close said valve when the liquid is discharged therefrom to a predetermined amount.

3. In a fluid lift device, an eduction tube, a housing closing about the lower end of said tube except for fluid openings at the upper end of said housing, a bucket-shaped float in said housing into which said tube extends, a valve associated with said bucket and moved thereby to open or close the lower end of said pipe, depending upon the level of liquid in said bucket.

4. In a fluid lift device, an eduction tube, a housing closing about the lower end of said tube except for fluid openings at the upper end of said housing, a bucket-shaped float in said housing into which said tube extends, a valve seat at the lower end of said tube, a valve member having a fluid passage and positioned to move to and from the lower end of said tube, a lower valve loosely connected with said float and positioned to engage the fluid passage in valve member and to close the same, and move said valve member into said seat.

5. In a fluid lift device, an eduction tube, a housing closing about the lower end of said tube except for fluid openings at the upper end of said housing, a bucket-shaped float in said housing into which said tube extends, means to direct fluid from said openings into said float, valves associated with said float and adapted to be moved thereby toward and away from the lower end of said tube to control the passage of fluid therethrough.

6. A fluid lift device including an eduction tube, a housing enclosing the lower end of said tube, a valve seat at the lower end of said tube, there being fluid openings at the upper end of said housing, a float bucket in said housing about said tube, and valve means controlled by the movement of said float bucket to regulate the passage of fluid to said tube, said valve means including an upper tubular member to engage said seat, and a float connected valve member below said tubular member to control the flow of fluid therethrough.

7. In a fluid lift device, an eduction tube, a housing about the lower end of said tube having openings therein above the lower end of said tube, a bucket-shaped float about the lower end of said tube in said housing, means to conduct fluid from said openings downwardly into said float, valve means to regulate the flow of fluid to the lower end of said tube, said float controlling the movement of said valve means, and means on said tube to cause a flow of fluid downwardly in said tube when desired.

8. In a device of the character described, a housing, a float in said housing, said float being open at its upper end and carrying a valve member associated with its lower interior end, a pipe extending downwardly into said float and having a passage in the lower end thereof, said valve member being adapted to engage the lower end of said passage, and means to conduct fluid from the exterior of said housing to the interior of said float.

9. In a device of the character described, a housing, a float in said housing, said float being open at its upper end and carrying a valve member at its lower interior end, a pipe extending downwardly into said float, a valve seat in the lower end of said pipe, said valve being adapted to engage said seat when said float is moved upwardly, and manually controlled means to reverse the direction of flow of fluid in said pipe and unseat said valve when desired.

10. In a fluid lift device, an eduction tube, a receptacle through which the fluid to be lifted is passed enroute to said tube, an inlet to admit fluid into said receptacle, a connection adapted to conduct fluid from said receptacle to said tube, and a valve responsive to the weight of fluid in said receptacle to control the flow of gas into said eduction tube.

11. In a fluid lift device, an eduction tube, a receptacle through which the fluid to be lifted is passed enroute to said tube, said receptacle being yieldably supported, means to conduct fluid into said receptacle, a conduit connected to said eduction tube and adapted to remove fluid from said receptacle, and a valve responsive to the weight of fluid in said receptacle to control the flow of gas into said eduction tube.

12. In a fluid handling device, an outlet tube subject to the pressure of gaseous fluid outside thereof, a receptacle into which said tube projects and through which the liquid being pumped is passed, said receptacle being yieldably supported, means for introducing liquid into said receptacle and whereby it is kept normally filled, means associated with yieldably supported receptacle and responsive to the weight of liquid therein to open and close the inlet into said outlet pipe in such a manner that the liquid will continue to be lifted as long as the supply of liquid maintains a predetermined weight of liquid in said receptacle.

13. In an air lift device, an eduction tube, a housing about the lower end of said tube, a float bucket in said housing into which said tube projects, a fluid inlet to said housing at its upper end, and a valve device in said bucket at the lower end of said tube responsive to the level of liquid in said bucket to control the passage of fluid into the lower end of said tube.

JAMES W. TAYLOR.